No. 677,810. Patented July 2, 1901.
U. P. SMITH.
PNEUMATIC TIRE.
(Application filed Oct. 17, 1900.)
(No Model.)
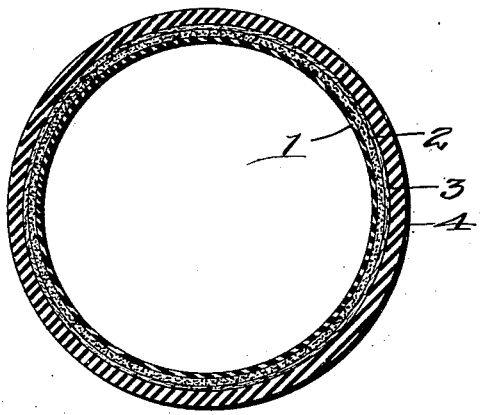
Fig. 1.
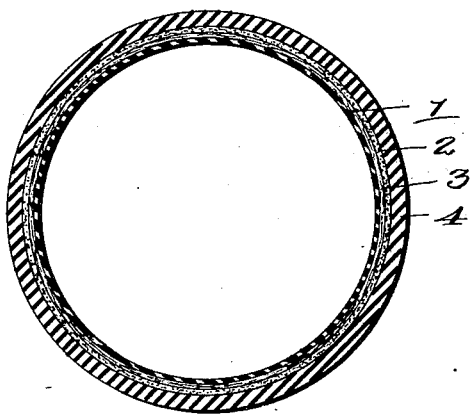
Fig. 2.
Fig. 3.
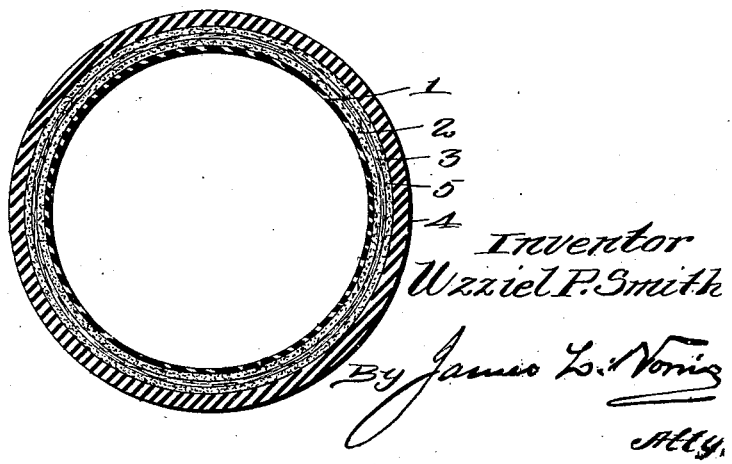
Witnesses:
C. D. Kesler
W. B. Keefer
Inventor
Uzziel P. Smith
By James L. Norris
Atty.
THE NORRIS PETERS CO., PHOTO-LITHO., WASHINGTON, D. C.

UNITED STATES PATENT OFFICE.

UZZIEL P. SMITH, OF CHICAGO, ILLINOIS, ASSIGNOR OF ONE-HALF TO THOMAS KANE, OF SAME PLACE.

PNEUMATIC TIRE.

SPECIFICATION forming part of Letters Patent No. 677,810, dated July 2, 1901.

Application filed October 17, 1900. Serial No. 33,373. (No model.)

*To all whom it may concern:*

Be it known that I, UZZIEL P. SMITH, a citizen of the United States, residing at Chicago, in the county of Cook and State of Illinois, have invented new and useful Improvements in Pneumatic Tires, of which the following is a specification.

My invention relates to certain new and useful improvements in pneumatic tires.

My invention has for its object to provide a tire which may be easily and quickly repaired by the rider in the event of puncture without the necessity of removing the tire from the rim or of carrying the wheel to a shop.

The invention also has for its object to provide a tire which, as compared with the tires now in use, is less liable to leak from any cause due to faulty construction or natural defects in the rubber of which the inner tube is composed.

To this end the invention resides in employing between one or more layers of the tire a substance which will not be vulcanized by heat, but which shall possess cementing qualities and be of a nature to dry or harden during and subsequent to the vulcanizing process. For this purpose I employ a rubber cement which may be readily rendered plastic by the use of a solvent. Preferably I employ a cement soluble in benzene. In the event of a puncture of an ordinary character, such as that made by a tack or the like, a small portion of the solvent is poured in the aperture and acting upon the cement reduces it to a plastic or semifluid consistency, so that it will spread and quickly fill up the opening made by the puncturing body. In addition to this function this cement operates to firmly unite the layers of the tire between which it is placed.

In order that my invention may be fully understood, I have illustrated the same in the accompanying drawings, in which—

Figure 1 is a cross-section through a tire, illustrating the preferred arrangement or construction thereof. Fig. 2 is a similar view illustrating a modification, and Fig. 3 is a like view illustrating a further modification.

Referring to the drawings, the numeral 1 indicates the inner air-tube of vulcanized rubber; 2, a layer of unvulcanizable cement applied to the outer side of said tube; 3, a layer of duck, canvas, or other fabric, having vulcanized rubber incorporated therewith, as usual, and 4 an outer layer of vulcanized rubber, forming the tread or wearing portion of the tire. These layers may be successively put upon a pole and afterward have their ends joined together to form the tire. After this the tire is vulcanized as usual by any of the well-known processes. The layer of unvulcanizable cement may be applied to the outside of the inner tube after it is made into a tube, or it may be applied to the surface of the rubber which is to form the outside of the tube before it is made into a tube. The amount of cement employed is greater than that necessary to merely cement the inner tube to the balance of the tire, so that sufficient cement is provided for closing any puncture that may occur, when benzene or other solvent is poured into the opening to soften the cement. After the cement has been softened by the benzene the tire may be pressed or pinched together about the aperture to assist the cementing operation. As previously stated, when the tire is submitted to the vulcanizing process or in a short time thereafter the cement will be simply dried or hardened, but not vulcanized. Hence while possessing all the properties of a cement it may be readily dissolved by the benzene or other solvent to form a healing solution to close a puncture.

A cement possessing the characteristics above indicated may be made from the following-named ingredients, mixed in about the proportions, by weight, stated: rubber, (or caoutchouc,) fifty per cent.; gutta-percha, ten per cent.; white lead, twenty per cent.; whiting, ten per cent., and sulfid of zinc, ten per cent. Other ingredients than those named, however, may be used and the proportions indicated may be varied.

A tire made according to my invention is not a puncture-closing tire in any sense, but what may be termed a "quick-repair" tire. The volume of dry unvulcanized cement which remains soluble, its character not having been changed by the process vulcanization, furnishes a temporary supply of soft or plastic cement at every point in the tire, when a proper solvent is applied, to seal any ordinary puncture. At the same time the cement secures the inner tube to the balance of the tire as firmly as though the parts had been vulcanized together, and the tire is equally as strong and durable in every way. This would not be the case if the cement remained always in a plastic condition, and the results herein indicated as being derived from the use of my invention are only possible when the cement employed is one that is not vulcanized by heat and which will be dried and hardened thereby, but which may be readily dissolved and rendered plastic by the use of a solvent.

Referring now to the modifications in Fig. 2, I have shown the layer 2 of cement as being placed between the layer of fabric and the outer layer of rubber, while in Fig. 3 I have shown a layer 5 of cement located between the outer layer of rubber and the layer of fabric in addition to the layer 2 of cement located as in Fig. 1.

Having thus fully described my invention, what I claim as new is—

1. A bicycle-tire composed of a number of layers, one or more of said layers being soluble, substantially as described.

2. A bicycle-tire composed of a number of layers, one or more of said layers being unvulcanized and soluble, substantially as described.

3. A bicycle-tire composed of a number of concentric layers, one or more of said layers being soluble, substantially as described.

4. A bicycle-tire composed of a number of layers, one or more of said layers being interposed and soluble, substantially as described.

5. A bicycle-tire composed of a number of layers, one or more of said layers consisting of a dry, soluble, cementitious substance, substantially as described.

6. A bicycle-tire composed of a number of layers, one or more of said layers consisting of a dry, soluble and unvulcanized substance, substantially as described.

7. A bicycle-tire composed of a number of layers, one or more of said layers consisting of a dry, soluble cement, substantially as described.

8. A pneumatic tire having an inner layer of vulcanized rubber surrounded by a layer consisting of dry, unvulcanized cement, a layer of fabric surrounding said layer of cement, and an outer layer of vulcanized rubber surrounding said fabric, substantially as described.

9. A pneumatic tire having an outer and inner layer of vulcanized rubber, and an interior layer of duck, or other fabric vulcanized to the outer layer and secured to the inner layer by means of a layer of unvulcanized, dry cement, substantially as described.

In testimony whereof I have hereunto set my hand in presence of two subscribing witnesses.

UZZIEL P. SMITH.

Witnesses:
M. E. DE GRAFF,
D. R. BAHAN.